United States Patent [19]

LaGarde et al.

[11] Patent Number: 4,690,967

[45] Date of Patent: Sep. 1, 1987

[54] HEAT-CURABLE ORGANOPOLYSILOXANE COMPOSITIONS

[75] Inventors: Robert LaGarde, Feyzin; Noel Bouverot, Saint Symphorien d'Ozon, both of France

[73] Assignee: Rhone-Poulenc Specialites Chimiques, Courbevoie, France

[21] Appl. No.: 685,148

[22] Filed: Dec. 21, 1984

[30] Foreign Application Priority Data

Dec. 21, 1983 [FR] France ............................ 83 20448

[51] Int. Cl.$^4$ ........................ C08K 5/54; C08K 3/36
[52] U.S. Cl. ................................ 524/266; 524/183; 524/404; 524/493; 524/500; 524/506
[58] Field of Search ............... 524/506, 493, 500, 183, 524/184, 185, 404, 405, 266

[56] References Cited

U.S. PATENT DOCUMENTS

| | | | |
|---|---|---|---|
| 2,710,290 | 6/1955 | Safford et al. | 514/506 |
| 3,070,560 | 12/1962 | Metevia | 524/183 |
| 3,449,290 | 6/1969 | Foster | 524/493 |
| 4,010,136 | 3/1977 | Blizzard et al. | 524/506 |
| 4,202,812 | 5/1980 | Murray | 524/493 |
| 4,539,357 | 9/1985 | Bobear | 524/500 |

FOREIGN PATENT DOCUMENTS

| | | |
|---|---|---|
| 51369 | 5/1982 | European Pat. Off. |
| 2380326 | 9/1978 | France. |
| 1002266 | 8/1965 | United Kingdom. |
| 2060667 | 5/1981 | United Kingdom. |

*Primary Examiner*—Lewis T. Jacobs
*Attorney, Agent, or Firm*—Burns, Doane, Swecker & Mathis

[57] ABSTRACT

Improved heat-curable organopolysiloxane compositions, easily vulcanizable into silicone elastomers, are comprised of (A) a major amount of a diorganopolysiloxane gum, (B) a reinforcing filler therefor, (C) optionally, a diorganopolysiloxane oil, (D) an organic peroxide catalyst, and minor amounts of at least three of the following four additives: (E) an organohydrogenopolysiloxane, (F) an organofluorinated polymer, (G) an organosilonxane irgabcompound bearing at least one acroyloxyalkyl or methacroyloxyalkyl substituent covalently bonded to a silicon atom thereof, and (H) a boron compound.

14 Claims, No Drawings

HEAT-CURABLE ORGANOPOLYSILOXANE COMPOSITIONS

BACKGROUND OF THE INVENTION

1. Field of the Invention:

The present invention relates to novel organopolysiloxane compositions formed principally by intimately admixing diorganopolysiloxane gums, fillers, a group of special additives and organic peroxides. The subject compositions have the advantage, firstly, of being easy to work in the crude state and, secondly, of providing, after hot curing, elastomers having good physical characteristics such as a low compressive set and a high elasticity.

2. Description of the Prior Art:

The introduction of a variety of additives for modifying the properties of diorganopolysiloxane compositions and of the elastomers resulting therefrom is described in numercus documents, the earliest of which date back to the time when heat-curable silicone elastomers were first marketed.

These prior art additives include: (1) Organosilicon compounds possessing SiH bonds, the use of which is described in:

(i) French Pat. No. 1,278,278; the silicone elastomers adhere to themselves and to various substrates. Linear organopolysiloxanes (in fact hydrogenoorganopolysiloxanes) are used in an amount of 4 to 20 parts per 100 parts of dioorganopolysiloxane gums. Reinforcing and non-reinforcing fillers can be added.

(ii) French Patent No. 1,363,839; the silicone elastomers have improved dielectric characteristics and a good adhesion to various substrates. Example 1 of this patent illustrates the use of 0.5 part of a methylhydrogenopolysiloxane per 99.5 parts of a methylvinylpolysiloxane gum.

(iii) French Pat. No. 1,377,569; the elastomers adhere to themselves. Hydrogenoorganopolysiloxanes are introduced in an amount of at most 20 parts (in the examples, on the order of 12 to 13 parts) per 100 parts of diorganopoly-siloxane gums; organopolysiloxanes modified by boron are also added in an amount of 5 to 60 parts per 100 parts of diorganopolysiloxane gums.

(iv) Japanese Published application No..73/093,658; the elastomers have a low compressive set and are only slightly affected by the phenomenon of effluorescence. Hydrogenoorganopolysiloxanes are introduced in a proportion of 0.1 to 10 parts per 100 parts of diorganopolysiloxane gums; calcium derivatives (hydroxide, oxide, hydride, peroxide) are also employed in the same proportions as the hydrogenoorganopolysiloxanes.

(v) British Patent application No. 2,060,667; the elastomers are suitable for the manufacture of gaskets for drive shafts. Hydrogenopolysiloxanes are introduced in an amount of 0.1 to 10 parts per 100 parts of diorganopolysiloxane gums. Two types of fillers are used: a reinforcing silica and diatomaceous earth. Furthermore—page 2, line 34, and page 4, line 9—the use of fluorinated polymer is suggested. (2) Organofluorinated polymers in the form of powders or colloidal materials, the use of which is described in:

(i) U.S. Pat. No. 2,710,290; the elastomers have very good mechanical properties, the tear strength in particular being high. Polytetrafluoroethylene powder having a particle diameter of 0.15 to 100$\mu$ is introduced in an amount of 1 to 20 parts per 100 parts of the diorganopolysiloxane gum.

(ii) U.S. Pat. No. 4,010,136; the elastomers have a smooth and uniform surface. A polytetrafluoroethylene powder having an average particle diameter of less than 1000$\mu$ is introduced in an amount of 0.3 to 1 part per 100 parts of a mixture formed from 100 parts of diorganopolysiloxane gums and 15 to 25 parts of reinforcing silicas.

(iii) European Published application No. 51,369; the elastomers are resistant to oils and hot hydrocarbon-based fuels. Polytetrafluoroethylene powder having an average particle diameter on the order of 30 to 500$\mu$ is introduced in an amount of 0.8 to 5 parts per 100 parts of a mixture of fluorinated silicone gums and reinforcing silicas. (3) Alkoxysilanes each possessing an acroyloxy or methacroyloxyalkyl group bonded to the silicon atom, the use of which is described in:

(i) U.S. Pat. No. 3,379,607; a compound such as methacroyloxypropyltrimethoxysilane of the formula $CH_2=C(CH_3)COO(CH_2)_3Si(OCH_3)_3$, which is known for improving adhesion, is intimately mixed with a polysiloxane elastomer (lines 28 to 33, column 1).

(ii) Japanese Published application No. 75/061,450; polyester fibers treated with methacroyloxypropyltrimethoxysilane are used as fillers in silicone compositions which cure under the action of heat to give elastomers.

(iii) Japanese Published application No. 78/118,452; Example 1 shows, by way of comparison, the introduction of 1.5 parts of methacroyloxypropyltrimethoxysilane per 100 parts of a dimethylpolysiloxane gum. The compositions provide elastomers which adhere strongly to various substrates.

(iv) U.S. Pat. No. 4,202,812; acroyloxy (or methacroyloxy) alkylalkoxysilanes are introduced in an amount of 0.08 to 0 3 part per 100 parts of a silicone rubber base, associated with 25 to 300 parts of non-reinforcing fillers. The elastomers have improved tensile properties. (4) Boron derivatives or the reaction product of such derivatives with organopolysiloxane polymers, the use of which is described in:

(i) French Pat. No. 1,130,806; the silicone compositions are easy to process. The boron derivatives, such as boric acid, boric anhydride or alkyl borates, are added in an amount of 0.005 to 0.9 part per 100 parts of diorganopoly-siloxane gums.

(ii) U.S. Pat. No. 3,070,560; the compositions are easy to work and they do not stick to the mixing mills and the arms of the kneaders. Boron derivatives, such as alkyl borates, boric acid and anhydride and silyl borates, are introduced in an amount of 0.015 to 0.25 part per 100 parts of diorganopoly-siloxane gums. Alpha, omega-di(hydroxy)diorganopolysiloxane oils having at least 1% by weight of OH groups are also present.

(iii) French Pat. No. 1,248,776; the elastomers are self-adhesive. They contain from 0.5 to 50 parts, per 100 parts of diorganopolysiloxane gums, of a boron-containing polysiloxane derived from the condensation of an alkoxypolysiloxane resin with a complex formed from boric acid and a hydroxyl compound.

(iv) French Pat. No. 1,377,569 (noted hereinabove, in paragraph 1); the boron-modified organopolysiloxanes are prepared by reacting approximately 3 to 30 parts of boron derivatives (such as alkyl borates, boric acid and anhydride, alkali metal and alkaline earth metal borates, boron hydrides) with 100 parts of organopolysiloxanes under the action of heat, in the presence or absence of a catalyst such as ferric chloride. Examples of appropriate organopolysiloxanes are di(hydroxy)dimethylpolysiloxane polymers, octamethylcyclotetrasiloxane and the hydrolysis products of dimethyldichlorosilane, where the latter may or may not be mixed with methyltrichlorosilane.

Thus, it is apparent from the foregoing that properties which are frequently valuable but sometimes disconcerting, such as the adhesion of the elastomers to themselves, can be obtained using one of the additives from the group consisting of hydrogenoorganopolysiloxanes, boron derivatives, acroyloxy (or methacroyloxy) silanes and organofluorinated polymers.

However, the manufacturers and users of silicone elastomers are still seeking materials which possess a set of constant, well-defined properties (and not all of the properties referred to above), irrespective of the quantities employed and the nature of the main constituents of the compositions which cure to give silicone elastomers.

In particular, serious need exists in this art for responsive compositions which do not stick to the rollers of the mixing mills and which do not develop a structure on standing. As regards the ultimate users, they would like more especially to process elastomers having good tensile characteristics, a low compressive set, a high resilience and a good heat stability, these properties applying both to opaque elastomers and to translucent and even transparent elastomers.

The state of this art is conspicuously devoid of suggestion of means to be used in order to achieve the results desired by both the manufacturers and users of silicone elastomers.

SUMMARY OF THE INVENTION

Accordingly, a major object of the present invention is the provision of novel organopolysiloxane which avoid the aforesaid disadvantages and drawbacks to date characterizing the state of this art, while at the same time being acceptable to both manufacturer and user.

Briefly, the present invention features incorporating into hot-curing silicone compositions, not one additive, but a plurality of additives comprising at least three (3) of the four (4) types of additives described above. Contrary to the state of this art, these additives, employed together, do not neutralize each other or degrade each other by mutual interaction; however, much more favorably than this, they unexpectedly have an enhanced efficacy when used together.

The invention also features the heat-curable organopolysiloxane compositions, per se, comprising the plurality of additives set forth above.

In the description which follows, all parts or percentages are by weight unless otherwise indicated.

DETAILED DESCRIPTION OF THE INVENTION

More particularly, according to the present invention, the subject compositions are advantageously formulated by intimately admixing:

(A) 100 parts of a diorganopolysiloxane gum having a viscosity greater than 1,000,000 mPa.s at 25° C.;

(B) 5 to 150 parts of a reinforcing filler;

(D) 0.1 to 7 parts of an organic peroxide, and a group of at least three (3) additives selected from among the following four (4) additives:

(E) 0.1 to 5 parts of an organohydrogenopolysiloxane;

(F) 0.1 to 6 parts of an organofluorinated polymer;

(G) 0.02 to 4 parts of an organosiloxane compound containing at least 1 acroyloxyalkyl or methacroyloxyalkyl group covalently bonded to a silicon atom; and (H) 0.1 to 4 parts of a boron compound.

The compositions according to the invention can also contain up to 15 parts of a diorganopolysiloxane oil (C) having a viscosity of at most 5000 mPa.s at 25° C.

The reinforcing filler is preferably a reinforcing pyrogenic or precipitated silica.

The preferred compositions according to this invention are formulated by intimately admixing:

(A) 100 parts of a diorganopolysiloxane gum having a viscosity greater than 1,000,000 mPa.s at 25° C., comprising a sequence of recurring units of the formula $R_2SiO$ and blocked at each end of the polymer chain by a unit of the formula $R_3SiO_{0.5}$ and/or a radical of the formula OR'; in these formulae, the symbols R, which are identical or different, represent methyl, ethyl, n-propyl, phenyl, vinyl and 3,3,3-trifluoropropyl radicals, at least 60% of these radicals being methyl and at most 3% being vinyl, and the symbol R' represents a hydrogen atom, an alkyl radical having from 1 to 4 carbon atoms or the beta-methoxyethyl radical;

(B) 5 to 150 parts of a reinforcing silica having a specific surface area of at least 50 m²/g;

(C) 0 to 15 parts of a diorganopolysiloxane oil having a viscosity of at most 5000 mPa.s at 25° C., comprising a sequence of recurring units of the formula $R''_2SiO$ and blocked at each end of the polymer chain by a radical of the formula OR'; in these formulae, the symbols R'', which are identical or different, represent methyl, phenyl and vinyl radicals, at least 40% of these radicals being methyl, and the symbol R' is as defined under (A);

(D) 0.1 to 7 parts of an organic peroxide, and a group of at least three (3) additives selected from among the following four (4) additives:

(E) 0.1 to 5 parts of an organohydrogenopolysiloxane of the average general formula

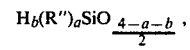

in which the symbol R'' is as defined under (C), the symbol $\underline{a}$ represents any number ranging from 0.4 to 2 and the symbol $\underline{b}$ represents any number ranging from 0.2 to 1;

(F) 0.1 to 6 parts of an organofluorinated polymer used in the form of a pulverulent solid and/or a colloidal aqueous dispersion;

(G) 0.02 to 4 parts of an organosilicon compound bearing at least one acroyloxyalkyl or methacroyloxyalkyl group and selected from among:

(1) A silane corresponding to the formula
in which the symbol R'' is as defined under (C), the symbol $R^3$ represents a hydrogen atom or the methyl radical, the symbol $R^4$ represents a methyl, ethyl, n-propyl or beta-methoxyethyl radical, the symbol $\underline{w}$ represents a number from 1 to 5 and the symbol $\underline{u}$ represents a number from 0 to 2;

(2) the partial hydrolysis products of the above silane; and (3) the polymers derived from the reaction of the silane of the formula $CH_2=C(R^3)COO(CH_2)_w$-$Si(OR^4)_3$, this formula corresponding to that given immediately above where u=0, with a diorganopolysiloxane oil selected from the oils (C) blocked at each end of their polymer chain by a hydroxyl radical; and (H) 0.1 to 4 parts of a boron compound used in the form of an organic or inorganic boron derivative or of a borosiloxane derived from the reaction of the said boron derivative with a polyorganosiloxane of the average general formula

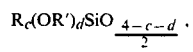

in which the symbols R and R' are each defined as under (A), the symbol $\underline{c}$ represents any number ranging from 0.5 to 3 and the symbol $\underline{d}$ represents any number ranging from 0 to 1.

The various constituents of the compositions according to the invention will now be described in more greater detail below.

The diorganopolysiloxane gums (A) having a viscosity greater than 1,000,000 mPa.s at 25° C., preferably greater than 2,000,000 mPa.s at 25° C., are linear polymers of high molecular weight, the diorganopolysiloxane chain of which consists essentially of recurring units of the abovementioned formula $R_2SiO$; this polymer chain is blocked or terminated at each end by units of the formula $R_3SiO_{0.5}$ and/or the radical of the formula OR'. The presence along the diorganopolysiloxane chain of small amounts of units other than $R_2SiO$, for example, of the formula $RSiO_{1.5}$ and/or $SiO_2$, is not excluded, however, same may be present in a proportion of at most 2% relative to the number of $R_2SiO$ units. Although the definitions of the radicals R and R' are set forth above, by the term "alkyl radical" there are particularly intended the $C_1$—$C_4$ alkyl radicals and more especially methyl, ethyl, n-propyl and n-butyl radicals.

Specific examples which are representative of the units of the formulae $R_2SiO$ and $R_3SiO_{0.5}$ and of radicals of the formula OR' are those of the formulae: $(CH_3)_2SiO$, $CH_3(CH_2\!=\!CH)SiO$, $CH_3(C_6H_5)SiO$, $(C_6H_5)_2SiO$, $CH_3(C_2H_5)SiO$, $(CH_3CH_2CH_2)CH_3SiO$, $CH_3(n.C_3H_7)SiO$, $(CH_3)_3SiO_{0.5}$, $(CH_3)_2CH_2\!=\!CHSiO_{0.5}$, $(CH_3(C_6H_5)_2SiO_{0.5}$, $(CH_3)(C_6H_5)(CH_2\!=\!CH)\!-\!SiO_{0.5}$, —OH, —OCH$_3$, —OC$_2$H$_5$, —O—n.C$_3$H$_7$, —O—iso.C$_3$H$_7$, —O—n.C$_4$H$_9$, and —OCH$_2$CH$_2$OCH$_3$.

It is prefererd to use methylvinylpolysiloxane gums containing a small quantity of vinyl radicals, this quantity representing, for example, from 0.005 to 1.5% of the number of radicals bonded to the silicon atoms.

The gums (A) are readily commercially available from silicone manufacturers; they can also be prepared in accordance with techniques well known to this art.

The fillers, preferably the reinforcing silicas (B), are used in an amount of 5 to 150 parts, preferably 8 to 100 parts, per 100 parts of diorganopolysiloxane gums (A). They are preferably selected from among the pyrogenic silicas and precipitated silicas. They have a specific surface area, measured by the BET and CTAB methods, of at least 50 m$^2$/g, preferably of more than 70 m$^2$/g, an average primary particle size of less than 80 nm and a bulk density of less than 200 g/liter.

Such silicas can be incorporated as such or after having been surface treated with organosilicon compounds typically used for this purpose. These compounds include methylpolysiloxanes such as hexamethyldisiloxane and octamethylcyclotetrasiloxane, methylpolysilazanes such as hexamethyldisilazane and hexamethylcyclotrisilazane, chlorosilanes such as dimethyldichlorosilane, trimethylchlorosilane, methylvinyldichlorosilane and dimethylvinylchlorosilane, and alkoxysilanes such as dimethyldimethoxysilane, dimethylvinylethoxysilane and trimethylmethoxysilane. In this treatment, the silicas can increase their initial weight in a proportion of up to 20%, preferably of about 18%.

In addition to the reinforcing silicas (B), it is possible to introduce coarser inorganic fillers having an average particle diameter greater than 0.1μm. These fillers are represented more especially by ground quartz, calcined clays, diatomaceous silicas, calcium carbonate and the oxides of iron, titanium, magnesium and aluminum. They are introduced in an amount of at most 120 parts, preferably of at most 100 parts, per 100 parts of the gums (A). These inorganic fillers can be used as such, i.e., untreated, or treated with the organosilicon compounds mentioned above in the case of the reinforcing silicas (B).

The diorganopolysiloxane oils (C) are used in an amount of 0 to 15 parts, preferably 0.3 to 12 parts, per 100 parts of diorganopolysiloxane gums (A). They are linear polymers having a relatively low viscosity of at most 5000 mPa.s at 25° C., preferably of at most 4000 mPa.s at 25° C., the diorganopolysiloxane chain of which is formed essentially of recurring units of the abovementioned formula $R''_2SiO$; this chain is blocked or terminated at each end by a radical of the abovementioned formula OR'. At least 40%, preferably at least 45%, of the radicals R'' are methyl radicals.

The definitions of the symbols R'' and R' are as noted hereinabove.

Specific examples which are representative of the units of the formula $R''_2SiO$ and of radicals of the formula OR' are those of the formulae: $(CH_3)_2SiO$, $CH_3(CH_2\!=\!CH)SiO$, $CH_3(C_6H_5)SiO$, $(C_6H_5)_2SiO$, $C_6H_5(CH_2\!=\!CH)SiO$, —OH, —OCH$_3$, —OC$_2$H$_5$, —O—n.C$_3$H$_7$ and —OCH$_2$CH$_2$OCH$_3$.

The following are preferably used:

(i) dimethylpolysiloxane oils blocked at each end of their polymer chain by hydroxyl, methoxy or beta-methoxyethoxy radicals and having a viscosity of 10 to 200 mPa.s at 25° C.; and (ii) methylphenylpolysiloxane oils consisting of $CH_3(C_6H_5)SiO$ units, blocked at each end of their polymer chain by hydroxyl and/or methoxy radicals and having a viscosity of 40 to 2000 mPa.s at 25° C.

The purpose of using the oils (C) is to prevent the compositions of the invention from changing during storage and more precisely from developing a structure and curing; they are therefore "structure inhibitors". Their use is recommended in particular when the amounts of reinforcing silicas (B) are large, for example, above 30–40 parts per 100 parts of the gums (A).

Other structure inhibitors, for example, diphenylsilanediol and the silanes of the formulae:

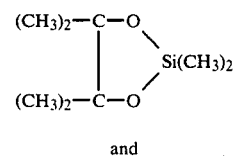

and

-continued

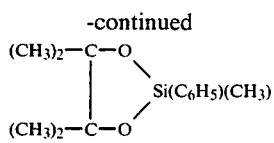

can replace all or a portion of the oils (C).

However, the immediately aforesaid are frequently more expensive and/or demand more effort than the oils (C), to disperse them in the compositions of the invention.

The organic peroxides (D) are used in an amount of 0.1 to 7 parts, preferably 0.2 to 5 parts, per 100 parts of the gums (A). They are well known to those skilled in the art and include, more especially, benzoyl peroxide, 2,4-dichlorobenzoyl peroxide, dicumyl peroxide, 2,5-bis(t-butylperoxy)-2,5-dimethylhexane, t-butyl perbenzoate, peroxy-t-butyl isopropyl carbonate, di-t-butyl peroxide and 1,1-bis(t-butylperoxy)-3,3,5-trimethylcyclohexane.

These various peroxides decompose at temperatures and rates which sometimes differ. They are selected according to the required curing conditions.

The groups of additives which characterize the compositions of the invention consist of additives selected from the organohydrogenopolysiloxanes (E), the organofluorinated polymers (F), the organosilicon compounds bearing at least one acroyloxy(or methacroyloxy)alkyl function, and the boron-containing compounds (H). Each mixture or group of additives contains at least three (3) additives.

Thus, there exists a choice between five (5) groups of additives, each containing:

(1) E, F, G
(2) E, F, H
(3) E, G, H
(4) F, G, H
(5) E, F, G, H

The organohydrogenopolysiloxanes (E) are used in an amount of 0.1 to 5 parts, preferably 0.2 to 4 parts, per 100 parts of the gums (A). They preferably correspond to the abovementioned formula

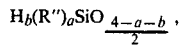

in which the symbol R″ represents a methyl, vinyl or phenyl radical, the symbol $\underline{a}$ represents a number ranging from 0.4 to 2 and the symbol $\underline{b}$ represents a number ranging from 0.2 to 1.

Such organohydrogenopolysiloxanes (E) are selected from among the linear, branched or cyclic polymers consisting of units selected from those of the formulae: R″$_2$SiO, H(R″)SiO, H(R″)$_2$SiO$_{0.5}$, HSiO$_{1.5}$, R″SiO$_{1.5}$, SiO$_2$ and R″$_3$SiO$_{0.5}$.

They can be liquid, gummy or resinous. In particular:

(i) the linear polymers can correspond to the formula below:

(H)$_t$(R″)$_{3-t}$Si(OSiR″$_2$)$_x$[OSi(R″)H]yOSi(R″)$_{3-t(H)t}$ in which $\underline{x}$ = 0 to 10,000, $\underline{y}$ = 0 to 1000 and $\underline{t}$ = 0 or 1, $\underline{y}$ representing at least 2 when $\underline{t}$ = 0; (ii) the cyclic polymers can correspond to the formula below:

(HR″SiO)$_p$(R″$_2$SiO)$_{p'}$ in which $\underline{p}$ = 1 to 10 and $\underline{p'}$ = 0 to 10;

(iii) the resinous polymers can consist of:

(a) recurring units of the formulae H(R″)SiO, R″SiO$_{1.5}$, and R″$_2$SiO, distributed as to provide the ratios R″/Si=1.05 to 1.5 and H/Si=0.3 to 0.5, or (b) recurring units of the formulae H(R″)$_2$SiO0.5 and SiO$_2$, distributed as to provide the ratios R″/Si=0.5 to 1.3 and H/Si=0.25 to 0.7.

By way of specific examples, representative organohydrogenopolysiloxanes are those: - of the formulae:

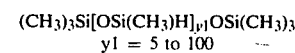
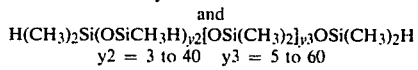

and consisting of recurring units of the formulae: (CH$_3$)$_2$HSiO$_{0.5}$ and Si$_2$, with (CH$_3$)/Si=0.4 to 1.1 and H/Si=0.2 to 0.6.

The fluorinated polymers (F) are used in an amount of 0.1 to 6 parts, preferably 0.15 to 5 parts, per 100 parts of the diorganopolysiloxane gums (A). These compounds are well known to those skilled in this art; they are prepared by the polymerization or copolymerization of monomers selected, for example, from among tetrafluoroethylene, chlorotrifluoroethylene, vinylidene fluoride and hexafluoropropene. They are therefore polymers or copolymers of recurring units derived from the above monomers; thus, it is possible to use polytetrafluoroethylenes, binary copolymers of the polytetrafluoroethylene/betafluoropropene type or of the vinylidene fluoride/hexafluoropropene type, and ternary copolymers of the vinylidene fluoride/hexafluoropropene/tetrafluoroethylene type.

These compounds can be introduced into the compositions of the invention in the form of powders having an average particle diameter of less than 1000μ, for example, a diameter ranging from 25 to 650μ. They can also be introduced in the form of aqueous dispersions or emulsions. In this case, the dispersed particles of the polymers generally have an average diameter on the order of 0.01 to 15μ, preferably 0.02–12μ; in practice, they are in the colloidal or micellar state. The dispersions can contain variable proportions of fluorinated polymers, for example, on the order of 20 to 80% by weight. Apart from the fluorinated polymers, they contain dispersants and, if appropriate, basic agents.

Preferably, the dispersants are non-ionic surface-active compounds such as polyethoxylated alkylphenols in which the alkyl group contains from 7 to 12 carbon atoms and the polyoxyethylene group contains from 8 to 15 —OCH$_2$CH$_2$— units. The dispersions of colloidal particles of fluorinated polymers are well known. They are described, in particular, in U.S. Pat. Nos. 2,478,229, 2,534,058 and 2,946,763.

The organosilicon compounds (G) are used in an amount of 0.02 to 4 parts, preferably 0.03 to 3 parts, per 100 parts of diorganopolysiloxane gums (A). They include the silanes corresponding to the abovementioned general formula:

in which, as above indicated, the symbol R″ represents a methyl, vinyl or phenyl radical, the symbol R3 represents a hydrogen atom or the methyl radical, the symbol R4 represents a methyl, ethyl, n-propyl or beta-methoxyethyl radical, the symbol $\underline{w}$ represents a number from 1 to 5 and the symbol $\underline{u}$ represents a number from 0 to 2. They therefore comprise the methacroyloxyalkylalkoxysilanes and the acroyloxyalkylalkoxysilanes, which are mentioned, for example, in U.S. Pat. No. 3,567,497.

Specific examples of these silanes which are representative are those of the formulae: $CH_2=CH-COOCH_2Si(OCH_3)_3$, $CH_2=CH=COOCH_2Si(OCH_2CH_2OCH_3)_2C_6H_5$, $CH_2=CH-COO(CH_2)_3Si(OC_2H_5)_3$, $CH_2=C(CH_3)COO(CH_2)_3Si(OCH_3)_3$, $CH_2=C(CH_3)COO(CH_2)_3SiCH_3(OCH_3)_2$ and $CH_2=C(CH_3)COO(CH_2)_5Si(OCH_3)_3$ In addition to the silanes, it is permissible to use the same proportions of their partial hydrolysis products, which correspond to the average general formula:

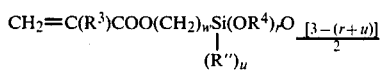

in which the symbols R″, $R^3$, $R^4$, $\underline{w}$ and $\underline{u}$ are as defined above in respect of the formula of the silanes (G) and the symbol $\underline{r}$ represents any number ranging from 0.5 to 2.2, with the sum $\underline{r}^+$ $\underline{u}$ ranging from 0.8 to 2.5.

It is recommended to carry out the hydrolysis of the silanes at temperatures within the range of 30° to 100° C., in the presence of an acid catalyst such as hydrochloric acid, phosphoric acid or acetic acid, with a molar quantity of water which is less than the quantity necessary to hydrolyze all of the $SiOR^4$ linkages (one mol of water theoretically makes it possible to convert 2 $SiOR^4$ linkages to one Si-O-Si siloxane linkage). The hydrolysis can take place in a hydrocarbon or halogenohydrocarbon solvent or in the absence of a solvent.

Apart from the silanes (G) and their products of partial hydrolysis, it is also possible to use the same proportions of the reaction products of the silanes of the formula (G'):

$$CH_2=C(R^3)COO(CH_2)_wSi(OR^4)_3$$

(derived from the formula of the silanes (G) with $\underline{u}$32 0) with diorganopolysiloxane oils (C) limited to those blocked at each end of their polymer chain by a hydroxyl radical, having a viscosity of 70 to 500 mPa.s at 25° C. and containing at least 60% of methyl radicals and at most 3% of vinyl radicals. These oils will henceforth be referred to as (C').

The oils (C') and the silanes (G') must be mixed in proportions such that the molar ratio $SiOH/SiOR^4$ ranges from 0.1 to 0.95. Furthermore, the reaction is catalyzed with the aid of a compound selected from among the alkyl titanates and polytitanates and diorganotin salts of aliphatic carboxylic acids, used in an amount of 0.05 to 2 parts per 100 parts of the mixture of oils (C') and silanes (G'). The alcohol of the formula $R^4OH$ formed during the reaction may or may not be removed from the reaction mixtures. If it is removed, it is necessary not to exceed 45% of the theoretical quantity by weight, based on the number of SiOH and $SiOR^4$ radicals present in the mixtures. A process of this type is described in French Pat. No. 2,447,386; it provides stable organopolysiloxane compositions having a viscosity of 60 mPa.s to 20,000 mPa.s at 25° C.

The compounds (H) containing boron are used in an amount of 0.1 to 4 parts, preferably 0.2 to 3 parts, per 100 parts of the diorganopolysiloxane gums (A).

These compounds can be introduced in the form of organic or inorganic boron derivatives. Among these compounds, exemplary are boric acid and anhydride, tetraboric or pyroboric acid $H_2B_4O_7$ and the linear and cyclic organoborates of the formulae:

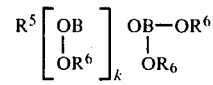

and

in which the radical $R^5$ represents an alkyl radical having from to 10 carbon atoms or a phenyl radical, the symbol $R^6$ represents $R^5$ or a hydrogen atom, the symbol $\underline{k}$ represents 0 to 3 and the symbol $\underline{k}$ represents 3 to 5.

By way of illustration of such organoborates, representative are trimethyl borate, triethyl borate, tri-n-propyl borate, triphenyl borate and trimethylboroxine.

Other boric acid esters, as well as boron hydrides, boron complexes and metal borates, which can be introduced, are described in U.S. Pat. No. 3,231,542, column 6.

Moreover, the organic and inorganic boron compounds can be introduced in the form of intimate mixtures with other compounds not containing boron. Thus, it is possible to use a mixture containing boric acid, a polyalcohol (such as ethylene glycol or glycol) and fillers; this type of mixture is described in French Pat. No. 2,451,927. It is also possible to use a mixture of mixed silicon and boron oxides, obtained by the combustion of boron and silicon halides (U.S. Pat. No. 3,855,171), or a mixture of precipitated silica and boric acid (published German patent application 2,716,225, French Pat. No. 2,431,992).

Moreover, the compounds (H) containing boron can be introduced in the form of borosiloxanes; these compounds are prepared by reacting the organic or inorganic boron derivatives described above with polyorganosiloxanes of the abovementioned average general formula:

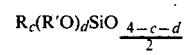

in which the symbols R and R' are defined as were the symbols R and R' previously used to describe the gums (A) (more exactly, the symbol R represents a methyl, ethyl, n-propyl, phenyl, vinyl or 3,3,3-trifluoropropyl radical and the symbol R' represents a hydrogen atom, an alkyl radical having from 1 to 4 carbon atoms or a beta-methoxyethyl radical), the symbol $\underline{c}$ represents any number ranging from 0.5 to 3 and the symbol $\underline{d}$ represents any number ranging from zero to 1.

These organopolysiloxanes can have either a linear, cyclic or branched structure.

The linear diorganopolysiloxanes include those consisting of a sequence of $R_2SiO$ recurring units and blocked at each end of their polymer chain by units of the formula $R_3SiO_{0.5}$ and/or radicals of the formula OR'; the viscosity of these diorganopolysiloxanes can range from 10 to 1,000,000 mPa.s at 25° C. By way of illustration, exemplary are dimethylpolysiloxane oils having a viscosity of 50 to 5000 mPa.s at 25° C. and blocked at each end of their polymer chain by a trimethylsiloxy radical, a hydroxyl radical or an alkoxy radical such as methoxy, ethoxy, n-propoxy or n-butoxy.

The cyclic diorganopolysiloxanes include those corresponding to the formula:

$$(SiR_2O)_{\underline{f}}[SiR(OR')O]_{\underline{f'}}$$

in which the symbol $\underline{f}$ represents an integer from 3 to 15 and the symbol $\underline{f'}$ represents a number from zero to 3.

By way of illustration, exemplary are hexamethylcyclotrisiloxane, octamethylcyclotetrasiloxane and decamethylcyclopentasiloxane.

The branched organopolysiloxanes, in the liquid or resinous state, include polymers consisting of recurring units selected from among those of the formulae $R_3SiO_{0.5}$; $R_2SiO$, $RSiO_{1.5}$, $SiO_2$, $R_2(R'O)SiO_{0.5}$, $R'OSiO_{1.5}$ and $(R'O)_2SiO$, such units being distributed as to provide a ratio R/Si ranging from 0.5 to 1.8 and a ratio R'O/Si ranging from 0 to 0.8.

By way of illustration, exemplary are the organopolysiloxane resins formed of:

(i) recurring units of the formulae $(CH_3)_3SiO_{0.5}$ and $SiO_2$, with a ratio $CH_3/Si=0.9$ to 1.5 and having 0.2 to 1% of hydroxyl groups.

(ii) recurring units of the formulae $CH_3SiO_{1.5}$, $(CH_3)_2SiO$ and $(CH_3)_3SiO_{0.5}$, with a ratio $CH_3/Si=1.05$ to 1.6 and having from 0.1 to 3% of ethoxy groups, and (iii) recurring units of the formulae $CH_3SiO_{1.5}$, $C_6H_5SiO_{1.5}$ and $(CH_3)_2SiO$, with a ratio $(CH_3+C_6H_5)/Si=1.2$ to 1.6 and having from 0.1 to 2% of hydroxyl groups.

The reaction of the organic or inorganic boron compounds with the organopolysiloxanes is effected by heating, preferably at temperatures within the range of 100° to 250° C., for a sufficient period of time to obtain a homogeneous mixture, the quantities employed being, for example, from 1 to 30 parts of boron compounds per 100 parts of organopolysiloxanes. Catalysts, such as ferric chloride or aluminum chloride, can be added in order to accelerate the reaction. However, in view of the fact that they are difficult to remove from the reaction products, their use is not essential.

Volatile products are frequently formed during the reaction. They can be removed by heating for an extended period of time at atmospheric pressure or by heating for a shorter period of time with the application of a pressure below atmospheric pressure. Methods for the preparation of the borosiloxanes are provided, in particular, in French Pat. Nos. 1,248,775, 1,377,569, 1,509,310 and 1,591,565, U.S. Pat. No. 3,310,521 and Japanese Published Application 77/022,051.

In addition to the constituents (A), (B), (C) and (D) and the additives (E), (F), (G) and (H), it is envisaged to incorporate inorganic and organic pigments such as carbon black, aluminum powder and phthalocyanines, as well as heat stabilizers such as carboxylic acid salts of iron, cerium and manganese.

Other adjuvants can also be utilized (for example, (1) agents for neutralizing the decomposition products formed during the crosslinking or at high temperature, such as the hydroxides and oxides of calcium, magnesium and barium (European Pat. No. 51,369), carboxylic acid salts of calcium and calcium silicate, and (2) agents for retarding combustion, based on platinum derivatives).

These platinum derivatives are typically selected from among chloroplatinic acid $H_2PtCl_6.6H_2O$, platinic chloride $PtCl_4$ and platinous chloride $PtCl_2$ and their complexes or their reaction products with organic or organosilicon compounds. They are preferably used in association with cerium oxides and hydroxides or with oxides of titanium, iron or aluminum obtained by combustion. Such associations are mentioned, inter alia, in French Pat. Nos. 2,051,792, 2,166,313 and 2,203,846.

The compositions according to the invention are formulated using known mechanical means, for example, kneaders, mixing mills or mixing screws. The various constituents are introduced into these apparatuses in an arbitrary order. However, it is recommended to charge firstly the gums (A) and the reinforcing silicas (B) and lastly the peroxides (D).

The compositions obtained are stable on storage; furthermore, they display the ability, a desideratum of the manufacturers and formulators, of being easy to work in mixing mills because of their high cohesion and toughness. Thus, they do not stick to the rollers even when they are made into 0.5 mm thick sheets.

They can be cured to give elastomers by heating under pressure or under atmospheric pressure at temperatures on the order of 100° to 350° C. The heating time obviously varies with the temperature, the pressure and the nature of the peroxides; it is generally several minutes at about 100°–200° C. and a few seconds at about 250°–350° C.

The elastomers formed in this manner especially those obtained by molding, can be heated subsequently in the range of 200°–280° C., for a period of at least 1 hour, for the purpose of completing their crosslinking and removing the volatile materials contained therein.

Nevertheless, as from completion of their first crosslinking phase, i.e., before the post-heating phase which may be carried out, these elastomers possess good physical characteristics and, more precisely, a high resilience and an excellent compressive set.

Furthermore, they can have a distinct transparency, which they retain even after they have been maintained for a long period of time at a high temperature, for example, of about 200°–250° C. To obtain this transparency, it is necessary to employ compositions containing neither pigments, nor fillers other than those based on reinforcing silicas (pyrogenic silica, precipitated silica, silica aerogel), nor fluorinated polymers (F) other than those dispersed in the colloidal state in an aqueous medium.

The elastomers derived from compositions containing coarser fillers and/or pigments, as well as nonmicellar fluorinated polymers (F), are not transparent, but they nevertheless keep an excellent heat stability, which manifests itself qualitatively by retention of the initial coloration.

The compositions according to the invention can be used for the manufacture, by molding, calendering or extrusion, of numerous components made of silicone elastomers or objects covered or coated with these elastomers.

These components can be gaskets, sections, tubes or various forms of protective objects intended, for example, for the mechanical sector (sealing rings), the automotive sector (headlamp lenses, sparkplug caps), the building sector (door and window frame seals) and the household electrical sector (seals for oven and refrigerator doors).

The objects covered with elastomers concern more especially electrical cables surrounded by an elastomer sheath, and composite associations consisting of glass fabrics (or other flat materials) and elastomer sheets.

Because the silicone elastomers are perfectly safe, the components can also be used in the fields of medicine, pharmacy and food; in these applications, they are preferably translucent or even transparent. They can have the shape of, for example, tubes (for blood transfusion and dialysis apparatuses), nipples, plugs, plates (for heat insulation), etc.

In order to further illustrate the present invention and the advantages thereof, the following specific examples are given, it being understood that same are intended only as illustrative and in nowise limitative.

EXAMPLE 1

The following ingredients were intimately admixed, using a malaxator: (i) 80 parts of a diorganopolysiloxane gum having a viscosity of about 25 million mPa.s at 25° C., blocked at each end of its polymer chain by a dimethylvinylsiloxy unit and containing, in its polymer chain, 99.9% of dimethylsiloxy units and 0.1% of methylvinylsiloxy units; (ii) 20 parts of a dimethylpolysiloxane gum having a viscosity of 20 million mPa.s at 25° C. and blocked at each end of its polymer chain by a trimethylsiloxy unit; (iii) 1.5 parts of an aqueous dispersion containing 60% by weight of polytetrafluoroethylene particles (having an average diameter of 0.25 to 0.35$\mu$) and 3% by weight of a nonionic dispersant;

(iv) 2 parts of a boron-containing methylpolysiloxane prepared as described in Example 1 of French Pat. No. 1,377,569;

(v) 0.5 part of a linear methylhydrogenopolysiloxane having a viscosity of 45 mPa.s at 25° C., blocked at each end of its polymer chain by a trimethylsiloxy unit and containing, in its polymer chain, essentially methylhydrogenosiloxy units; and (vi) 30 parts of a precipitated silica having an external specific surface area of 155 m$^2$/g The malaxation was terminated 30 minutes after the introduction of the silica had been completed. The homogeneous composition which was thus prepared was removed from the malaxator and transferred to a mixing mill having 2 rollers, and 0.5% by weight of 2,5-dimethyl-2,5-di(tert.-butylperoxy)hexane was incorporated therein using such mill.

It was found that, for a very small nip of 0.5 mm between the rollers, the composition could be worked rapidly without adhering to the rollers.

The catalyzed composition was cured to give an elastomer by heating in molds (of which, some had a depth of 2 mm and others a depth of 8 mm) for 10 minutes at 170° C., under a pressure of 30 bar. The elastomer plates obtained were then placed for 4 hours in a ventilated oven heated to 200° C. The plates were found to have good transparency.

Standardized samples were then taken from these plates and the following properties were measured:

(1) Shore hardness according to ASTM Standard D 2240;

(2) Tensile strength (TS) according to AFNOR Standard T 46002 corresponding to ASTM Standard D 412;

(3) Elongation at break in % according to the above Standard T 46002;

(4) Tear strength (TRS) according to ASTM Standard D 624;

(5) Compressive set (CS) measured in % after heating the test-pieces for 22 hours at 177° C. under 25% compression;

(6) ZWICK resilience in % according to DIN Standard 53512.

The results obtained were as follows:

| (1) | Shore hardness | 43 |
| (2) | TS in MPa | 5.3 |
| (3) | Elongation at break in % | 400 |
| (4) | TRS in kN/m | 10 |
| (5) | CS in % | 18 |
| (6) | ZWICK resilience in % | 55 |

The above test was repeated following the same procedure and using exactly the same constituents, except that 0.1 part of the silane of the formula $CH_2=C(CH_3)COO(CH_2)_3Si(OCH_3)_3$ was added.

The results relating to the above properties were as follows:

| (1) | Shore hardness A | 46 |
| (2) | TS in MPa | 5.6 |
| (3) | Elongation at break in % | 370 |
| (4) | TRS in kN/m | 10 |
| (5) | CS in % | 15 |
| (6) | ZWICK resilience in % | 60 |

EXAMPLE 2

The following ingredients were intimately admixed using a malaxator: (i) 100 parts of a diorganopolysiloxane gum having a viscosity of 30 million mPa.s at 25° C., blocked at each end of its polymer chain by a dimethylvinylsiloxy unit and containing, in its polymer chain, 99.8% of dimethylsiloxy units and 0.2% of methylvinylsiloxy units; (ii) 2 parts of an aqueous dispersion containing 60% by weight of polytetrafluoroethylene particles (having an average diameter of 0.25 to 0.35$\mu$) and 3% by weight of a nonionic dispersant; (iii) 1 part of the silane of the formula: $CH_2=C(CH_3)COO(CH_2)_3Si(OCH_3)_3$;

(iv) 2.5 parts of a boron-containing methylpolysiloxane prepared as described in Example 1 of French Pat. No. 1,377,569;

(v) 1.5 parts of a dimethylpolysiloxane oil having a viscosity of 50 mPa.s at 25° C. and blocked at each end of its polymer chain by a hydroxyl radical bonded to the terminal silicon atom;

(vi) 1.2 parts of a branched methylhydrogenopolysiloxane having a viscosity of 15 mPa.s at 25° C. and consisting of $(CH_3)_2HSiO_{0.5}$ and $SiO_2$ recurring units respectively distributed in a ratio of 2; and (vii) 50 parts of a precipitated silica having an external specific surface area of 155 m$^2$/g.

The malaxation was terminated 1 hour after the introduction of all of the reactants had been completed.

The homogeneous composition obtained was removed from the malaxator and then transferred to a mixing mill having two rollers; 0.5% by weight of 2,5-dimethyl-2,5-di(tert.butylperoxy)hexane was then incorporated therein using this mill. At the end of this step, it was found firstly that the composition did not stick to the surface of the rollers and, secondly, that it could be worked easily by virtue of its high cohesion.

The catalyzed composition was cured to give an elastomer by heating in molds, in the manner described in Example 1, for 10 minutes at 170° C., under a pressure of 30 bar.

The elastomer plates prepared in this manner were transparent. They were baked by heating at 200° C. for 4 hours. They retained their good transparency after this treatment. Standardized samples were then taken from these baked plates and their physical characteristics were measured. The results obtained were as follows:

| (1) | Shore hardness A | 73 |
|---|---|---|
| (2) | TS in MPa | 6.4 |
| (3) | Elongation at break in % | 230 |
| (4) | TRS in kN/m | 11 |
| (5) | CS in % | 19 |
| (6) | ZWICK resilience in % | 51 |

EXAMPLE 3

A1: The following ingredients were intimately admixed using a malaxator:

(i) 100 parts of a diorganopolysiloxane gum having a viscosity of 30 million mPa.s at 25° C., blocked at each end of its polymer chain by a dimethylvinylsiloxy unit and containing, in its polymer chain, 94.8% of dimethylsiloxy units, 5% of diphenylsiloxy units a d 0.2% of methylvinylsiloxy units;

(ii) 1.5 parts of an aqueous dispersion containing 60% by weight of polytetrafluoroethylene particles (having an average diameter of 0.25 to 0.35μm) and 3% by weight of a nonionic dispersant;

(iii) 0.3 part of the reaction product (described in Example 1(a) of French Pat. No. 2,447,386) of the silane of the formula $CH_2=C(CH_3)COO(CH_2)_3Si(OCH_3)_3$ with a dimethylpolysiloxane oil blocked at each end of its polymer chain by a hydroxyl radical bonded to the silicon atom, and having a viscosity of 100 mPa.s at 25° C.; this product was a liquid having a viscosity of 1000 mPa.s at 25° C.;

(iv) 6 parts of a dimethylpolysiloxane oil having a viscosity of 100 mPa.s at 25° C. and blocked at each end of its polymer chain by a hydroxyl radical bonded to the silicon atom;

(v) 0.7 part of a linear methylhydrogenopolysiloxane having a viscosity of 45 mPa.s at 25° C., blocked at each end of its polymer chain by a trimethylsiloxy unit and containing, in its polymer chain, essentially methylhydrogenosiloxy units; and (vi) 38 parts of a pyrogenic silica having a specific surface area of 200 m²/g.

The malaxation was terminated one hour after the introduction of all the reactants had been completed. The composition obtained was removed from the malaxator and then placed in a mixing mill having two rollers; 1.5% by weight of a paste containing 2,4-dichlorobenzoyl peroxide dispersed in a bis(trimethylsiloxy)dimethylpolysiloxane oil having a viscosity of 1000 mPa.s at 25° C., in a weight ratio of 50/50, was then incorporated therein using the mill.

The catalyzed composition separated easily from the rollers of the mill. It was then extruded into a 2 mm thick ribbon.

This ribbon was then cured by a 20-second pass through an oven heated to 350° C. Portions of the ribbon were baked by heating at 200° C. for 4 hours. They were transparent throughout with no trace of opalescence. Their physical characteristics were measured and the results obtained were as follows:

| (1) | Shore hardness A | 55 |
|---|---|---|
| (2) | TS in MPa | 9.1 |
| (3) | Elongation at break in % | 450 |
| (4) | TRS in kN/m | 15 |
| (5) | CS in % | 20 |
| (6) | ZWICK resilience in % | 50 |

A2: The test under A1 was repeated following the same procedure and using the same constituents, except that 1 part of a polytetrafluoroethylene powder having an average particle diameter of 100 m was used in place of 1.5 parts of the aqueous dispersion containing 60% by weight of polytetrafluoroethylene particles.

It was noted that the physical characteristics of the baked elastomer plates were virtually identical to those of the plates produced under A1; however, the transparency of the plates had disappeared and was replaced with a distinct opalescence.

A3: Likewise, another test was carried out which was analogous to the one under A2, but this time 1.5 parts of the aqueous dispersion containing 60% by weight of polytetrafluoroethylene particles were retained and 0.5 part of a 50/50 by weight mixture of boric acid $B(OH)_3$ and a dimethylpolysiloxane gum blocked at each end of its polymer chain by a trimethylsiloxy unit and having a viscosity of 50,000,000 mPa.s at 25° C. was also added.

The compositions were found to have an improved toughness; in particular, these compositions could undergo substantial stretching without tearing. The other properties of the compositions and the properties of the elastomers derived therefrom were analogous to those given under A1.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A heat-curable organopolysiloxane composition of matter, comprising (A) a major amount of a diorganopolysiloxane gum having a viscosity greater than 1,000,000 mPa.s at 25° C.; (B) a reinforcing amount of a reinforcing filler therefor; (D) a catalytic amount of an organic peroxide; and at least three of the following four constituents (E), (F), (G) and (H): (E) a minor amount of an organohydrogenopolysiloxane; (F) a minor amount of an organofluorinated polymer; (G) a minor amount of an organosiloxane compound containing at least one acroyloxyalkyl or methacroyloxyalkyl group covalently bonded to a silicon atom thereof; and (H) a minor amount of a boron compound.

2. The heat-curable organopolysiloxane composition as defined by claim 1, comprising:
   (A) 100 parts by weight of a diorganopolysiloxane gum having a viscosity greater than 1,000,000 mPa.s at 25° C.;
   (B) 5 to 150 parts by weight of a reinforcing filler therefor;
   (D) 0.1 to 7 parts by weight of an organic peroxide; and at least three of the following constituents (E), (F), (G) and (H):
   (E) 0.1 to 5 parts by weight of an organohydrogenopolysiloxane:
   (F) 0.1 to 6 parts by weight of an organofluorinated polymer:

(G) 0.02 to 4 parts by weight of an organosiloxane compound containing at least 1 acroyloxyalkyl or methacroyloxyalkyl group convalently bonded to a silicon atom thereof, and (H) 0.1 to 4 parts by weight of a boron compound.

3. The heat-curable organopolysiloxane composition as defined by claim 2, further comprising up to 15 parts by weight of a diorganopolysiloxane oil (C) having a viscosity of at most 5000 mPa.s at 25° C., which comprises a sequence of recurring units of the formula $R''_2SiO$ and blocked at each end of its polymer chain by a radical of the formula OR', in which formulae the symbols R'', which are identical or different, represent methyl, phenyl and vinyl radicals, at least 40% of such radicals being methyl, and the symbol R' represents a hydrogen atom, an alkyl radical having from 1 to 4 carbon atoms or a betamethoxyethyl radical.

4. The heat-curable organopolysiloxane as defined by claim 2, wherein said reinforcing filler (B) comprises a pyrogenic or precipitated silica having a specific surface area of at least 50 m²/g.

5. The heat-curable organopolysiloxane composition as defined by claim 2, wherein said diorganopolysiloxane gum (A) comprises a sequence of recurring units of the formula $R_2SiO$, and is blocked at each end of its polymer chain by a unit of the formula $R_3SiO_{0.5}$ and/or a radical of the formula OR', in which formulae the symbols R, which are identical or different, represent methyl, ethyl, n-propyl, phenyl, vinyl and 3,3,3-trifluoropropyl radicals, at least 60% of these radicals being methyl and at most 3% being vinyl, and the symbol R' represents a hydrogen atom, an alkyl radical having from 1 to 4 carbon atoms or a beta-methoxyethyl radical.

6. The heat-curable organopolysiloxane composition as defined by claim 2, wherein said organohydrogenopolysiloxane (E) has the average general formula

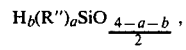

in which the symbol R'' represents a methyl, phenyl or vinyl radical, the symbol a represents any number ranging from 0.4 to 2 and the symbol b represents any number ranging from 0.2 to 1.

7. The heat-curable organopolysiloxane composition as defined by claim 2, wherein said organofluorinated polymer (F) comprises a pulverulent solid and/or an aqueous dispersion.

8. The heat-curable organopolysiloxane composition as defined by claim 2, wherein said organosiloxane compound (G) has the formula:

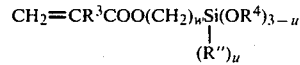

in which the symbol R'' represents a methyl, phenyl or vinyl radical, the symbol R³ represents a hydrogen atom or the methyl radical, the symbol R⁴ represents a methyl, ethyl, n-propyl or beta-methoxyethyl radical, the symbol $\underline{w}$ represents a number ranging from 1 to 5 and the symbol $\underline{u}$ represents a number ranging from 0 to 2.

9. The heat-curable organopolysiloxane composition as defined by claim 2, wherein said boron compound (H) comprises an organic or inorganic boron derivative.

10. An elastomeric organopolysiloxane comprising the composition of matter as defined by claim 1, in vulcanized state.

11. An elastomeric organopolysiloxane comprising the composition of matter as defined by claim 2, in vulcanized state.

12. A shaped article comprising the elastomeric organopolysiloxane as defined by claim 10.

13. A shaped article comprising the elastomeric organopolysiloxane as defined by claim 11.

14. The heat curable organopolysiloxane composition as defined by claim 2, wherein said boron compound (H) is a borosiloxane derived from the reaction of an inorganic or organic boron derivative with a polyorganosiloxane of the average general formula:

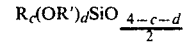

in which each symbol R represents a methyl, ehtyl, n-propyl phenyl, vinyl, or 3,3,3-trifluoropropyl radical, at least 60% of such radicals being methyl and at most 3% being vinyl, each symbol R' represents a hydrogen atom, an alkyl radical having from 1 to 4 carbon atoms or a beta-methoxyethyl radical, the symbol c represents any number ranging from 0.5 to 3 and the symbol d represents any number ranging from zero to 1.

* * * * *